United States Patent
Lee

(10) Patent No.: US 6,808,357 B2
(45) Date of Patent: Oct. 26, 2004

(54) ADJUSTMENT DEVICE FOR A STACKER TROLLEY

(76) Inventor: Wen-Ching Lee, No. 46-11, Pi-Tao, Pi-Tao Li, Tan-Shui Chen, Taipei Hsien (TW)

( * ) Notice: Subject to any disclaimer, the term of this patent is extended or adjusted under 35 U.S.C. 154(b) by 167 days.

(21) Appl. No.: 10/195,554

(22) Filed: Jul. 16, 2002

(65) Prior Publication Data

US 2004/0013505 A1 Jan. 22, 2004

(51) Int. Cl.⁷ .................................................. B66F 9/06
(52) U.S. Cl. ....................................................... 414/495
(58) Field of Search .......................... 280/43.12, 43.23; 414/607, 608, 495, 785, 723; 187/231, 232, 237

(56) References Cited

U.S. PATENT DOCUMENTS 3,462,167 A * 8/1969 Rateau ..................... 280/43.12
3,601,423 A * 8/1971 Goodacre ................. 280/43.12
3,701,211 A * 10/1972 Best ........................ 280/43.12
4,969,794 A * 11/1990 Larsen ....................... 414/495

FOREIGN PATENT DOCUMENTS

EP          0509976 A2 *  4/1992    ............. B66F/9/12
GB          2292730 A  *  3/1996    ............. B66F/9/06

* cited by examiner

Primary Examiner—Eileen D. Lillis
Assistant Examiner—Charles A. Fox
(74) Attorney, Agent, or Firm—Dennison, Schultz, Dougherty & MacDonald

(57) ABSTRACT

An adjustment device includes a distance adjustment device having two connection plates, two elongated through holes defined in the crossbar to correspond to each of the two connection plates, and two pairs of bolt-nut combinations each corresponding to the two holes of each of the two connection plates, and a height adjustment device which has a driving arm pivotally connected between the pump and the crossbar and having a protrusion formed on a bottom of the driving arm, a sliding track movably received in each of the forks and engaged with the protrusion of the driving arm, and a leverage adapted to be pivotally engaged with each of the forks and one distal end of which is connected to a first distal end of the sliding track and the other distal end of which is adapted to an auxiliary wheel of the fork.

2 Claims, 7 Drawing Sheets

ADJUSTMENT DEVICE FOR A STACKER TROLLEY

BACKGROUND OF THE INVENTION

1. Field of the Invention

The present invention relates to an adjustment device, and more particularly to an adjustment device for a stacker trolley. The adjustment device allows the user to adjust a distance between two forks and also a height of the two forks above the ground.

2. Description of Related Art

A conventional stacker trolley is shown in FIG. 7, wherein the stacker trolley has a body (70) with two forks (706), a bracket (90) securely connected to one end of the body (70) and a hydraulic pump (80) mounted on the body (70) for controlling upward/downward movement of the two forks (706). A yoke (701) is provided to one end of each of the two forks (706). The bracket (90) is composed of a crossbar (91) and two arms (92) each connected to one end of the crossbar (91). The crossbar (91) is securely connected to a bottom of the yoke (701) and the arms (92) are respectively and pivotally connected to a bottom of the hydraulic pump (80). When the user is using the stacker trolley and applies a force to the handle (801), the hydraulic fluid in the hydraulic pump (80) is pumped out so as to lift the forks (706). However, when using the stacker trolley, a major drawback is that the yoke (701) is securely connected to the two forks (706). Hence, the distance between the two forks (706) is fixed and can not be changed. When the size of the pallet to be moved by the trolley is changed from small to large or vice versa, the stacker trolley is no longer available to successfully and stably lift the pallet. Even when the pallet is actually lifted by the stacker trolley, because the forks (706) are indirectly yet securely connected to the hydraulic pump (80), the forks (80) are tilted. In this situation, the pallet and the cargo on top of the pallet will easily fall to the ground.

To overcome the shortcomings, the present invention tends to provide an improved adjustment device to mitigate and obviate the aforementioned problems.

SUMMARY OF THE INVENTION

The primary objective of the present invention is to provide an improved adjustment device for a stacker trolley to adjust the distance between the two forks, such that the stacker trolley is adaptable for all kinds of trolley with different dimensions.

Another objective of the present invention is to provide an improved adjustment device for the stacker trolley to maintain the forks in horizontal when the forks are lifted.

Other objects, advantages and novel features of the invention will become more apparent from the following detailed description when taken in conjunction with the accompanying drawings.

DETAILED DESCRIPTION OF THE PREFERRED EMBODIMENT

Figure 1:
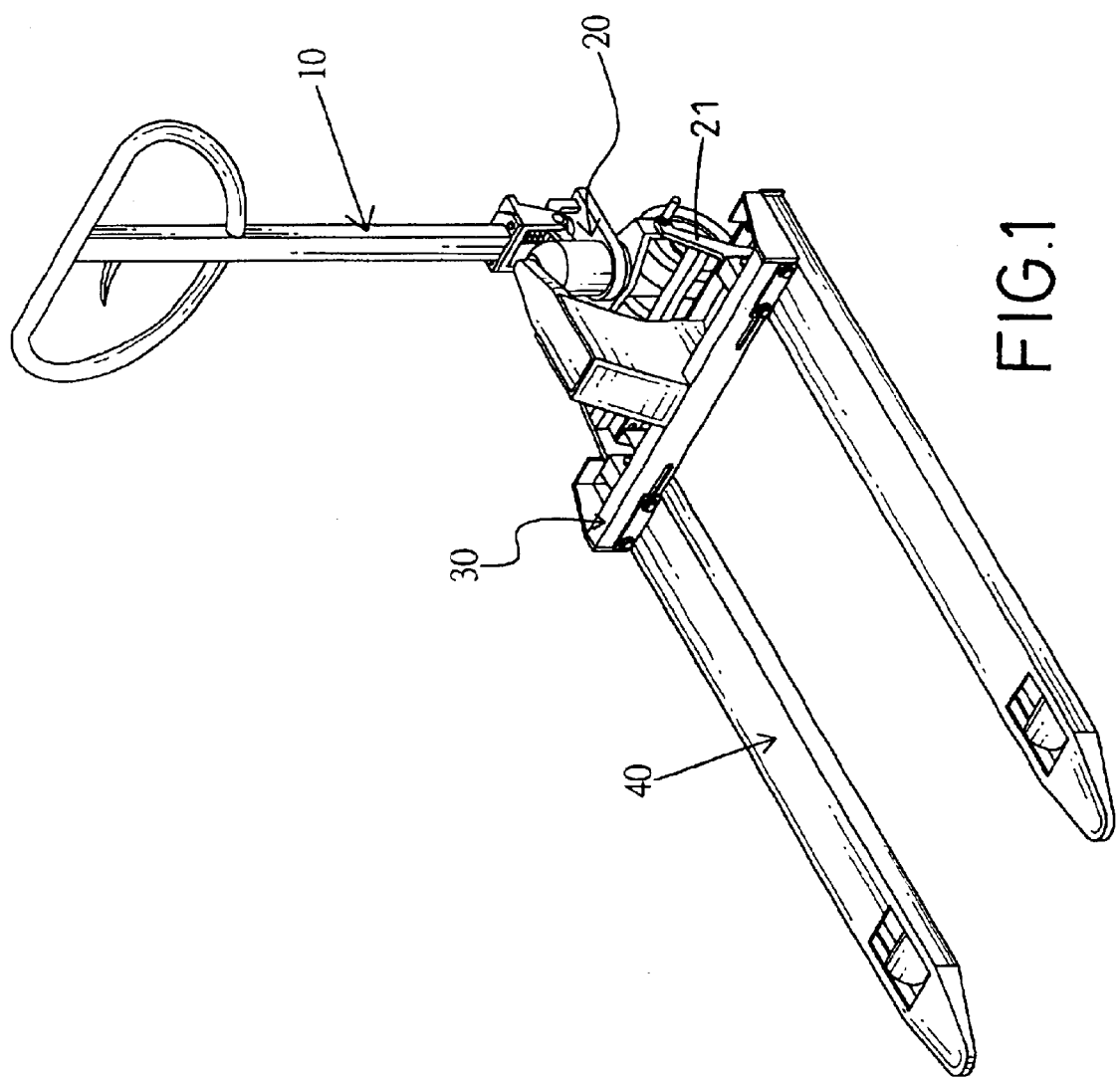
FIG. 1 is a perspective view showing the appearance of the stacker trolley.

With reference to FIG. 1, a stacker trolley has a handle (10), a pump (20), a crossbar (30) and a pair of forks (40). The handle (10) is able to control the initiation of the pump (20) and because the crossbar (30) is securely connected to a top face of the pump (20), the operation of the handle (10) not only initiates the function of the pump (20), but also lifts the crossbar (30). Again, because one end of each of the forks (40) is securely connected to a side of the crossbar (30), the movement of the crossbar (30) will drive the forks (40) to move simultaneously. The foregoing description is the same as the conventional stacker trolley. Therefore, there is only a brief introduction of the stacker trolley of the present invention showing that after the addition of the distance adjustment and height adjustment devices, the stacker trolley can till still fulfill the daily requirements.

Figure 2:
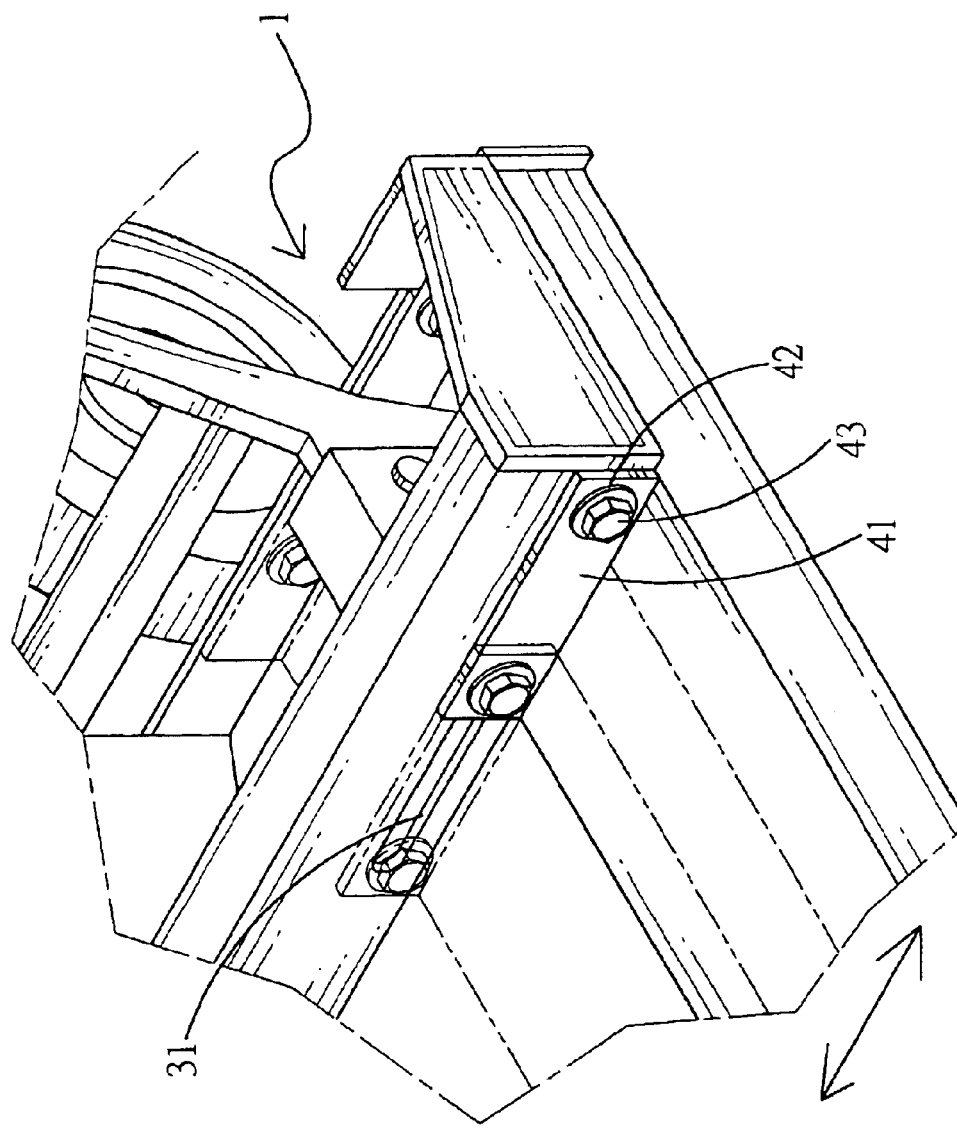
FIG. 2 is a partial perspective view of the distance adjustment device for the forks of the stacker trolley in FIG. 1.

With reference to FIG. 2, the distance between two forks (40) can be adjusted by a distance adjustment device (1) having a connection plate (41) vertically mounted on top of each of the forks (40). Each connection plate (41) is provided with two holes (42). The adjustment device further has an elongated through hole (31) defined through the crossbar (30) to correspond to the two holes (42). During assembly, two bolt-nut combinations (43) are applied to aligned holes (42) and the through hole (31) to fix the relative position of each of the forks (40) to the crossbar (30). Therefore, whenever the adjustment between the two forks (40) is required, the user only needs to loosen the bolt-nut combination (43) to move the connection plate (41) along the elongated through hole (31) and thus the distance between two forks (40) is adjusted.

Figure 3:
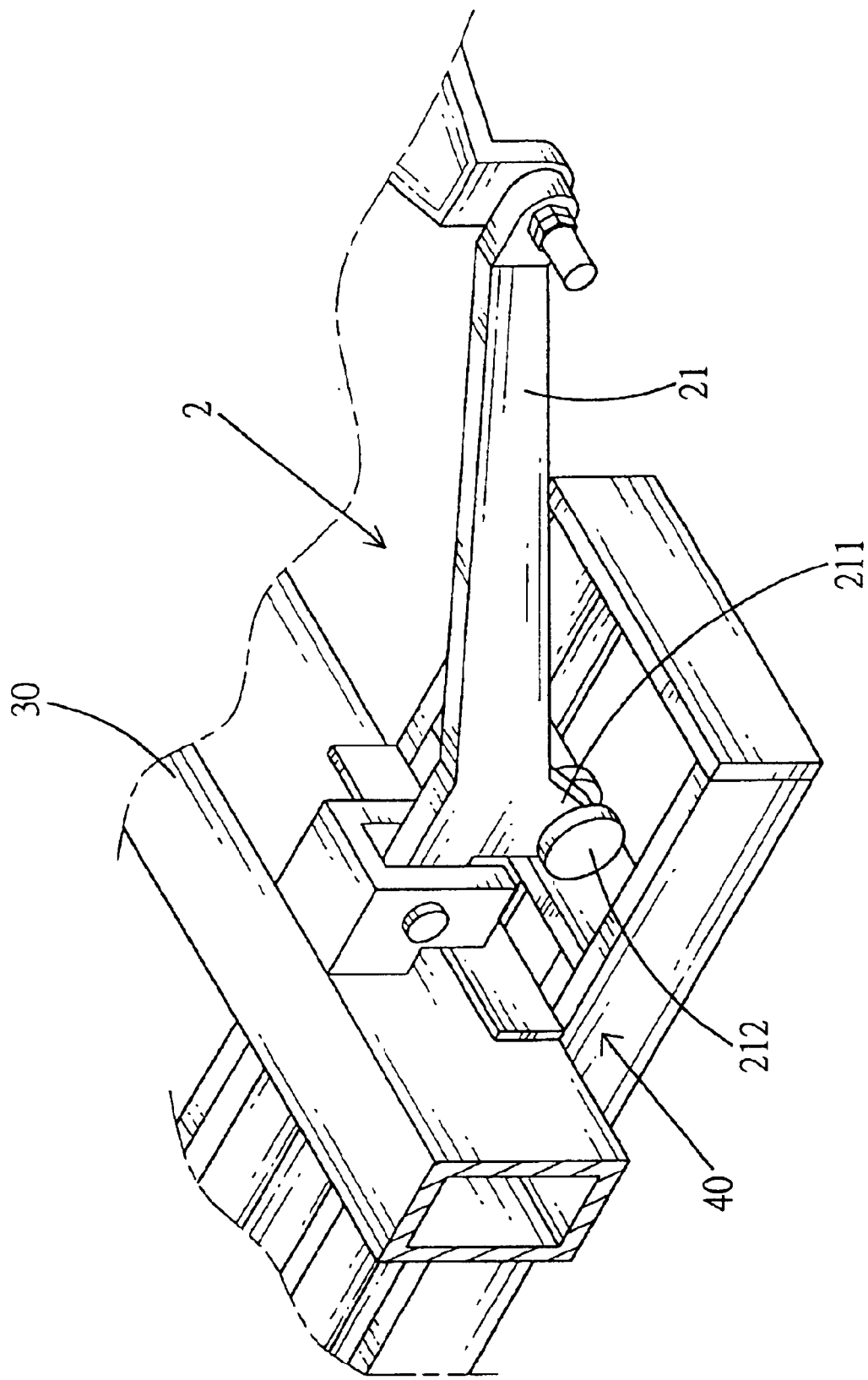
FIG. 3 is a partial perspective view of the height adjustment device for the auxiliary wheels of the stacker trolley in FIG. 1.
Figure 4:
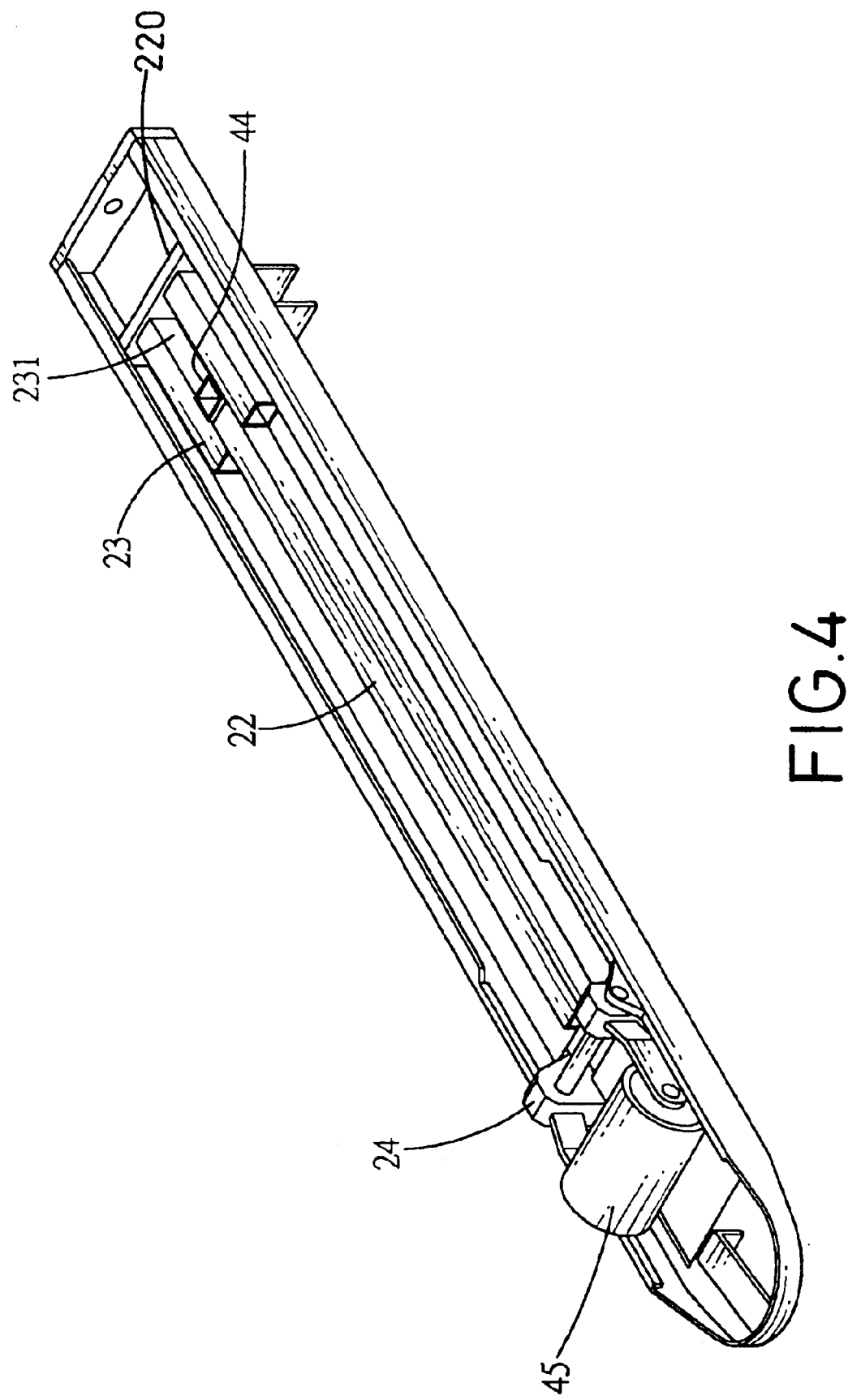
FIG. 4 is a perspective view showing the structure of the fork of the stacker trolley in FIG. 1.

With reference to FIGS. 3 and 4, the height of the auxiliary wheel (45) relative to the ground can be adjusted by a height adjustment device (2). The height adjustment device (2) includes a driving arm (21) one end of which is adapted to be pivotally connected to the pump (20) and the other end of which is also adapted to be pivotally connected to the crossbar (30), a sliding track (22) movably received in the fork (40) and a leverage (24) pivotally connected to the fork (40).

The driving arm (21) further has a protrusion (211) integrally formed on the driving arm (21) and a push wheel (212) formed on a bottom of the protrusion (211). The sliding track (22) has a pair of U seats (23) respectively formed on opposite sides of a distal end of the sliding track (22) and a head (220) formed on one distal end of each of the U seats (23) so that a track (231) is defined by the two U seats (23), the head (220) and the distal end of the sliding track (22). One distal end of the leverage (24) is securely connected to the other distal end of the sliding track (22) and the other distal end of the leverage (24) is pivotally connected to the auxiliary wheel (45).

Figure 5:
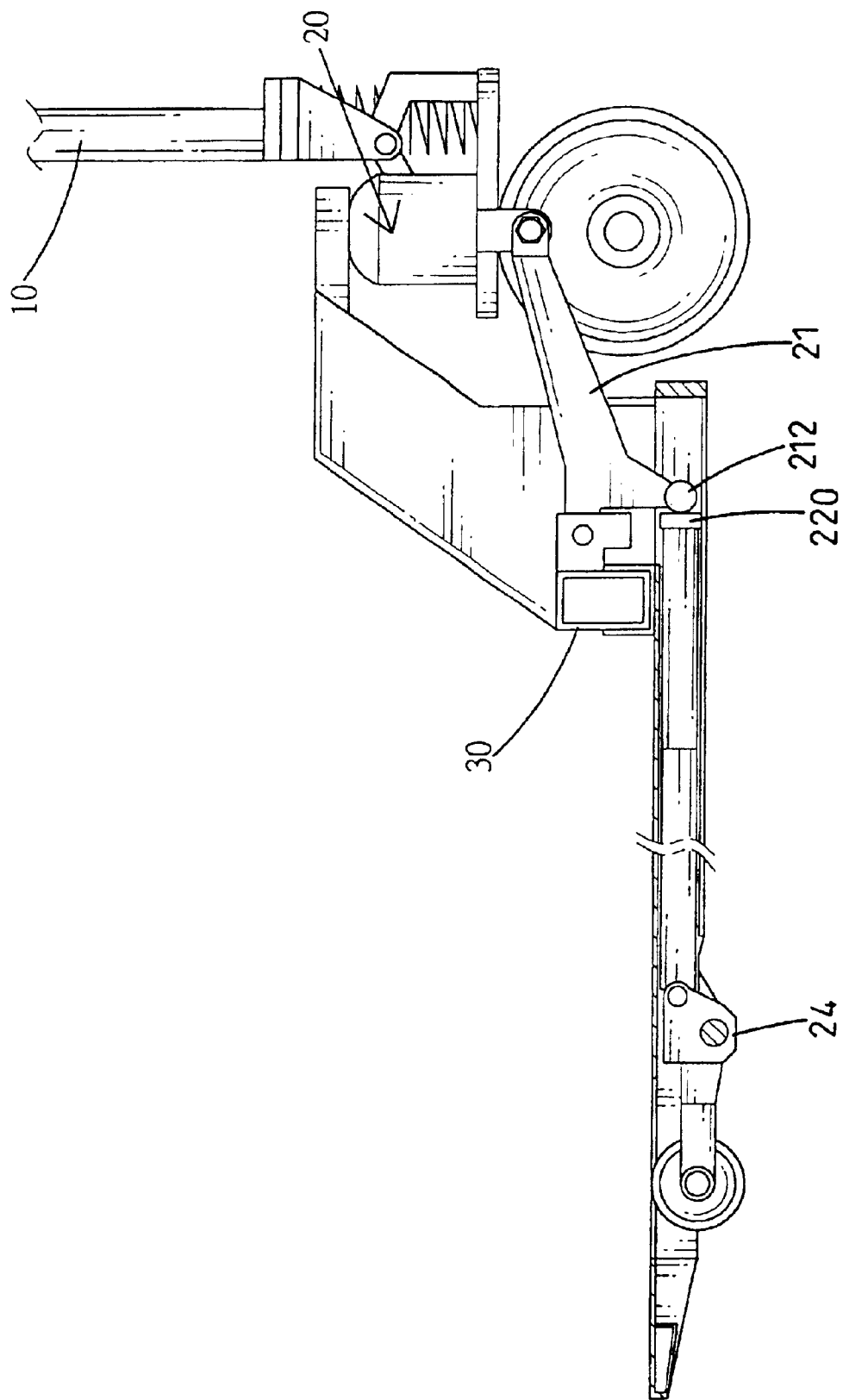
FIG. 5 is a side plan view showing that the height adjustment device in FIG. 3 is not in function.
Figure 6:
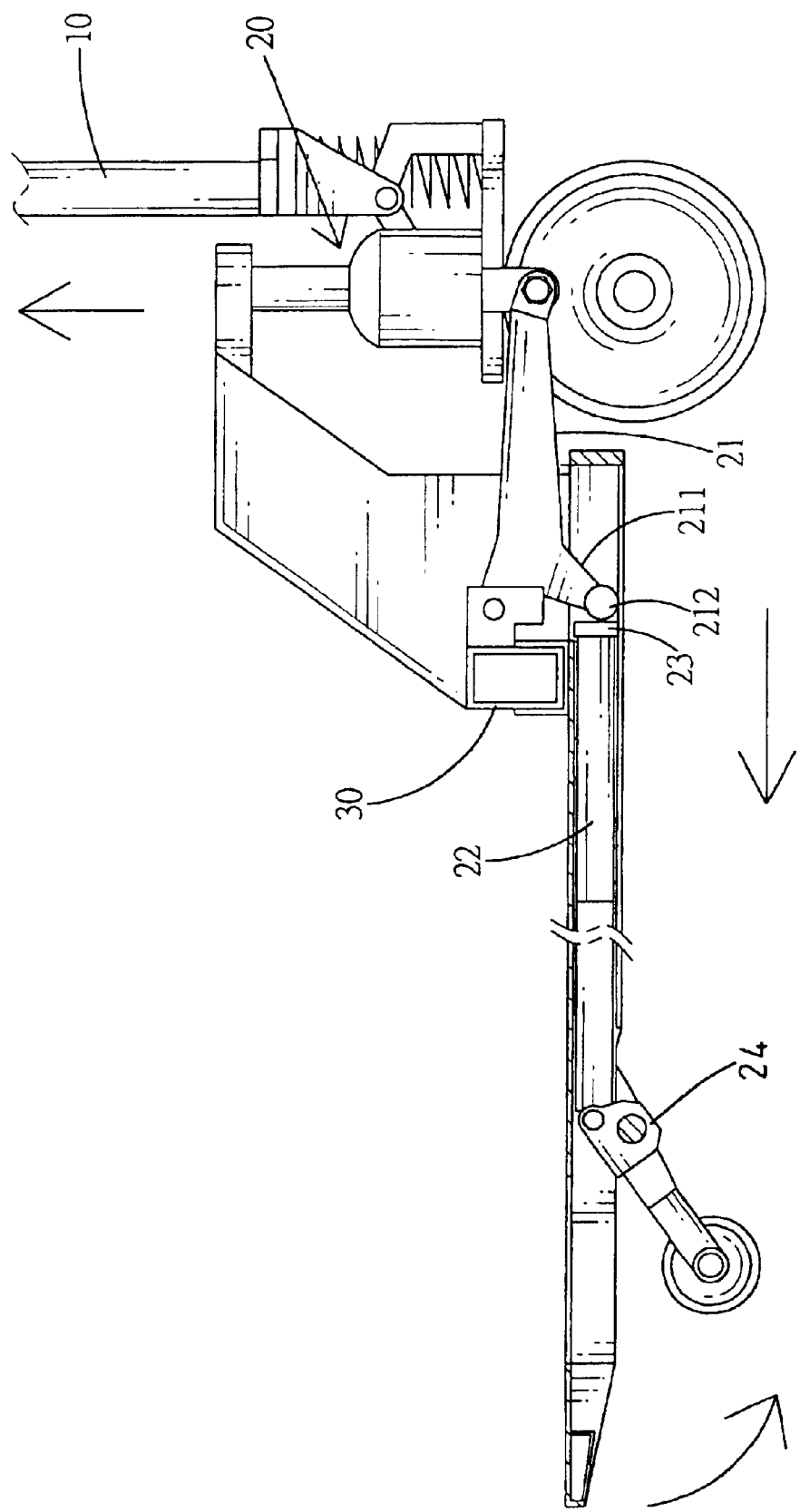
FIG. 6 is a side plan view showing that the height adjustment device is in function and the auxiliary wheels of the forks are also lifted.
Figure 7:
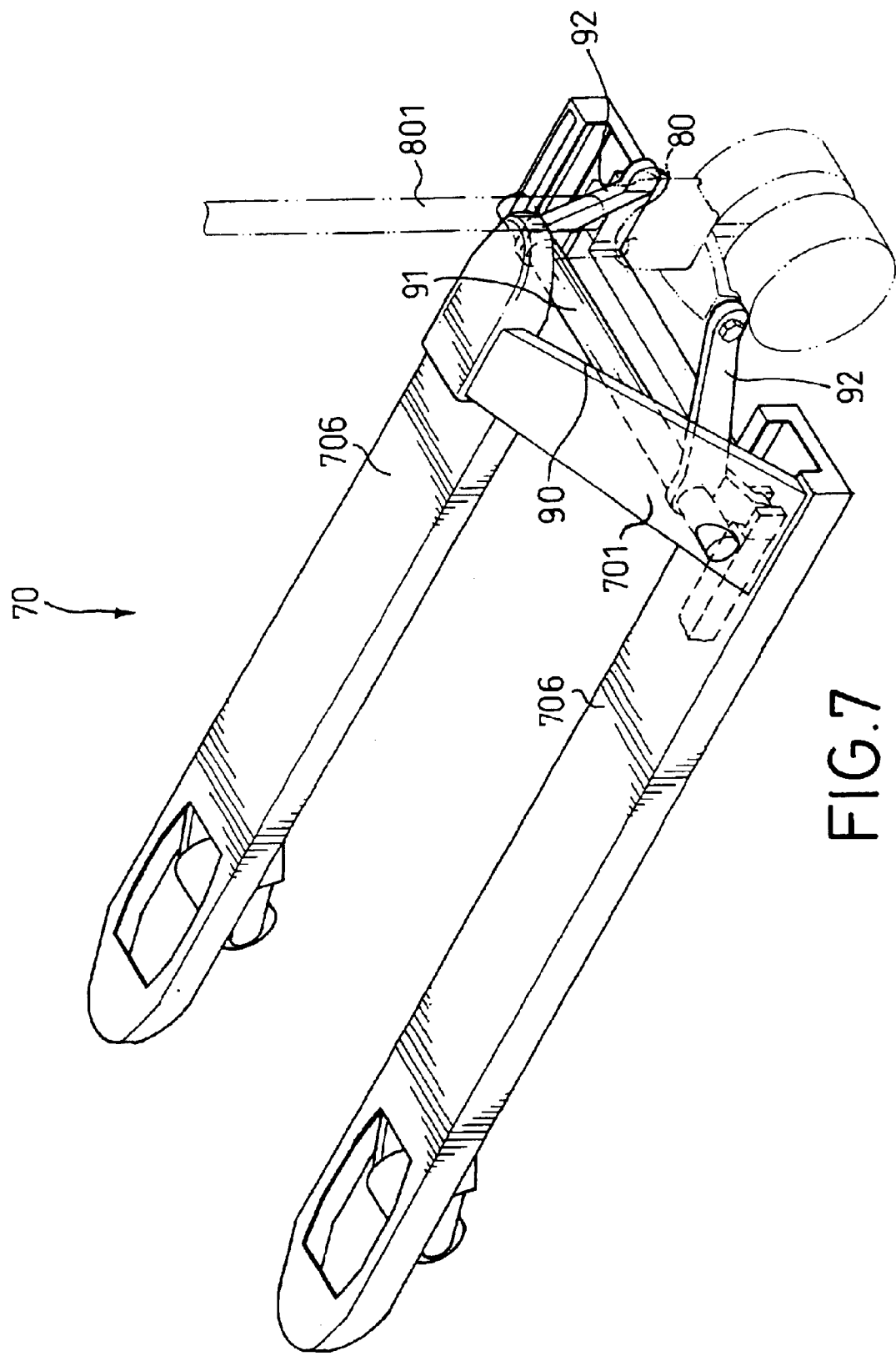
FIG. 7 is a perspective view showing a conventional stacker trolley.

When the height adjustment device (2) of the present invention is in application, with reference to FIGS. 5 and 6, the user cranks the handle (10) to initiate the upward movement of the pump (20). Because the crossbar (30) is securely connected to the pump (20), the upward movement of the pump (20) drives the crossbar (30) to move upward simultaneously. However, due to the driving arm (21) being pivotally connected to the crossbar (30), the driving arm (21) will pivot when the crossbar (30) moves upward. The pivotal movement of the driving arm (21) will thus cause the push wheel (212) to push the head (220). After the head (220) is pushed by the push wheel (212), the sliding track (22) moves under the fork (40) with a guiding block (44), which is integrally formed on a bottom face of the fork (40), sliding in the track (231) to direct the movement of the sliding track (22) under the fork (40). When the sliding track (22) moves, the movement thereof drives the leverage (24) to pivot. Therefore, the pivotal movement of the leverage (24) triggers the movement of the auxiliary wheel (45) to move relative to the fork (40). Accordingly, the relative position of the auxiliary wheel (45) to the fork (40) is changed. When the relative position of the auxiliary wheel (45) relative to the fork (40) is about to return to its original position, the user may release the hydraulic pressure in the pump (20) to lower the crossbar (30). Meanwhile the sliding track (22) will move in a direction directed to the driving arm (21), which forces the driving arm (21) to pivot. Therefore, the movement of the sliding track (22) allows the auxiliary wheel (45) to have room to return to its original position.

It can be concluded that the distance adjustment device (1) of the present invention enables the distance between the two forks (40) to adapt to the size of the pallet (not shown) so that the stacker trolley is suitable for all kinds of pallets of different dimensions. Moreover, when there is a load on the forks (40) and the load is transported to elsewhere by the stacker trolley, the user is able to lift the forks (40) simultaneously and still maintains the forks (40) in horizontal to the ground. Therefore, the load is able to be transported stably.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustment device for a stacker trolley having a handle, a pump operably connected to the handle, a crossbar securely connected to the pump and two forks respectively connected to two different sides of the crossbar, the adjustment device comprising:

a distance adjustment device having two connection plates each vertically adapted to be mounted on top of each of the two forks and having two holes defined therein;

two elongated through holes each adapted to be defined in the crossbar to correspond to each of the two connection plates; and two pairs of bolt-nut combinations each corresponding to the two holes of each of the two connection plates to secure a respective one of the two forks to the crossbar, a height adjustment device which has;

a driving arm adapted to be pivotally connected between the pump and the crossbar and having a protrusion formed on a bottom of the driving arm;

a sliding track adapted to be movably received in each of the forks and engaged with the protrusion of the driving arm;

a leverage adapted to be pivotally engaged with each of the forks and one distal end of which is connected to a first distal end of the sliding track and another distal end of which is adapted to an auxiliary wheel of the fork, a track defined in the sliding track by two U seats respectively formed on opposite sides of a second distal end of the sliding track and a head formed on distal ends of the two U seats to enrage with the protrusions; and a guiding block adapted to be formed on a bottom of the fork and received in the track to direct movement of the sliding track, whereby movement of the crossbar triggers the pivotal movement of the driving arm and thus the sliding track is pushed by the pivotal movement of the driving arm, the leverage is pushed by the movement of the sliding track, thereby relative position of the auxiliary wheel to the fork is adjusted, whereby adjustment of the bolt-nut combination enables change of engagement between the connection plate and a side face of the crossbar so that the forks are able to move relative to the crossbar, and distance between the two forks is changed.

2. The adjustment device as claimed in claim 1, wherein a push wheel is formed on a bottom of the protrusion to be engaged with the head.

* * * * *